(12) United States Patent
Kaku

(10) Patent No.: US 11,019,097 B2
(45) Date of Patent: May 25, 2021

(54) COMMUNICATION SYSTEM AND REPEATER

(71) Applicant: DENSO CORPORATION, Kariya (JP)

(72) Inventor: Yoshifumi Kaku, Kariya (JP)

(73) Assignee: DENSO CORPORATION, Kariya (JP)

(*) Notice: Subject to any disclaimer, the term of this patent is extended or adjusted under 35 U.S.C. 154(b) by 385 days.

(21) Appl. No.: 15/898,277

(22) Filed: Feb. 16, 2018

(65) Prior Publication Data

US 2018/0241770 A1 Aug. 23, 2018

(30) Foreign Application Priority Data

Feb. 23, 2017 (JP) .............................. JP2017-32294

(51) Int. Cl.
*H04L 12/46* (2006.01)
*H04W 4/44* (2018.01)
*H04L 29/06* (2006.01)
*H04L 29/08* (2006.01)
*H04L 12/823* (2013.01)

(52) U.S. Cl.
CPC .......... *H04L 63/1458* (2013.01); *H04L 12/46* (2013.01); *H04L 12/4641* (2013.01); *H04L 63/0227* (2013.01); *H04L 63/0876* (2013.01); *H04L 67/12* (2013.01); *H04W 4/44* (2018.02); *H04L 47/32* (2013.01); *H04L 67/14* (2013.01)

(58) Field of Classification Search
CPC . H04L 63/1458; H04L 12/46; H04L 12/4641; H04L 63/0876; H04L 67/12; H04L 47/32; H04L 67/14; H04W 4/44
USPC ........................................................ 726/23
See application file for complete search history.

(56) References Cited

U.S. PATENT DOCUMENTS

| | | | | |
|---|---|---|---|---|
| 7,701,897 B2* | 4/2010 | Nakao | ............... | H04M 1/72547 370/328 |
| 9,154,900 B1* | 10/2015 | Addepalli | ......... | H04W 72/0406 |
| 2014/0351878 A1 | 11/2014 | Zegman et al. | | |
| 2015/0358351 A1 | 12/2015 | Otsuka et al. | | |
| 2016/0065298 A1 | 3/2016 | Nakagawa et al. | | |
| 2016/0173530 A1* | 6/2016 | Miyake | ................... | H04L 63/08 726/3 |
| 2016/0330287 A1 | 11/2016 | Smith | | |

FOREIGN PATENT DOCUMENTS

| | | | | |
|---|---|---|---|---|
| EP | 1388792 A1 * | 2/2004 | ......... | H04L 67/1095 |
| JP | 2006-101428 A | 4/2006 | | |
| JP | 2006-164038 A | 6/2006 | | |
| JP | 2007-312193 A | 11/2007 | | |
| WO | WO-2012149443 A1 * | 11/2012 | ......... | H04L 63/1408 |

* cited by examiner

*Primary Examiner* — Kevin Bechtel
*Assistant Examiner* — Thanh H Le
(74) *Attorney, Agent, or Firm* — Posz Law Group, PLC

(57) ABSTRACT

A repeater serving as a relay device determines, when receiving a frame by a port, whether the received frame is a session request or not. When the received frame is a session request, the repeater then determines whether the repeater is in a prohibition state or not. When the repeater is in the prohibition state, the received frame is discarded. When the repeater is not in the prohibition state, the repeater then determines whether the repeater is in a determination state or not, and, when the repeater is in the determination state, the repeater transitions to the prohibition state for a preset prohibition period that to is set by a setting unit, for discarding the received frame.

18 Claims, 3 Drawing Sheets

COMMUNICATION SYSTEM AND REPEATER

CROSS REFERENCE TO RELATED APPLICATION

The present application is based on and claims the benefit of priority of Japanese Patent Application No. 2017-032294, filed on Feb. 23, 2017, the disclosure of which is incorporated herein by reference.

TECHNICAL FIELD

The present disclosure generally relates to an in-vehicle repeater and communication system.

BACKGROUND INFORMATION

The in-vehicle network system disclosed in published Japanese Patent Application No. 2013-168865 uses a technique in which a repeater authenticates an external device, registers the external device after successful authentication of the device, and communicates with the registered external device.

In cases where the repeater uses software to perform the authentication process, the repeater may be prevented from operating normally and performing authentication of external devices during a Denial of Service or "DoS" attack. Malicious external devices may be used to cause a DoS attack by overloading or "flooding" a transfer unit of the repeater with too many session requests. DoS attacks intentionally overload the resources of a computer or a communication device to block the normal communication functions and operation of the computer/communication device.

SUMMARY

The present disclosure provides a repeater configured to limit and protect against DoS attacks by reducing the communication load on the transfer unit of the repeater.

In an aspect of the present disclosure, a repeater disposed in a vehicle may include a communication controller, a transfer unit, and a filter. The filter may include a determination unit and a discard unit. The communication controller may be configured to relay data both within an external network outside the vehicle and within an internal network inside the vehicle. The external network may include an external device and be configured to transmit data from outside the vehicle to at least one in-vehicle device. The transfer unit may be configured to transfer data from a first network to a second network. The first network may include a transmission device such as the at least one in-vehicle device and the external device that transmits data. The second network may be different from the first network. For example, the first network may be configured to transmit data and the second network may be configured to receive data. The filter may sift or screen data transmitted from the transmission device and transferred by the transfer unit. The determination unit may be configured to determine whether data of a preset type is received from the transmission device at an interval that is equal to or shorter than a determination period. The determination period may be set based on a data transmission interval specific to one or more transmission devices. The discard unit may be configured to discard the received data from the transmission device during a prohibition period. The prohibition period may have a preset duration when the determination unit determines that the interval in which data received from the transmission device is equal to or shorter than the determination period.

A repeater with the aforementioned configuration may be used to reduce the communication load on the transfer unit of the repeater and thus better secure the repeater from DoS attacks.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, an embodiment of the present disclosure is described with reference to the drawings.

[1. Configuration]

Figure 1:
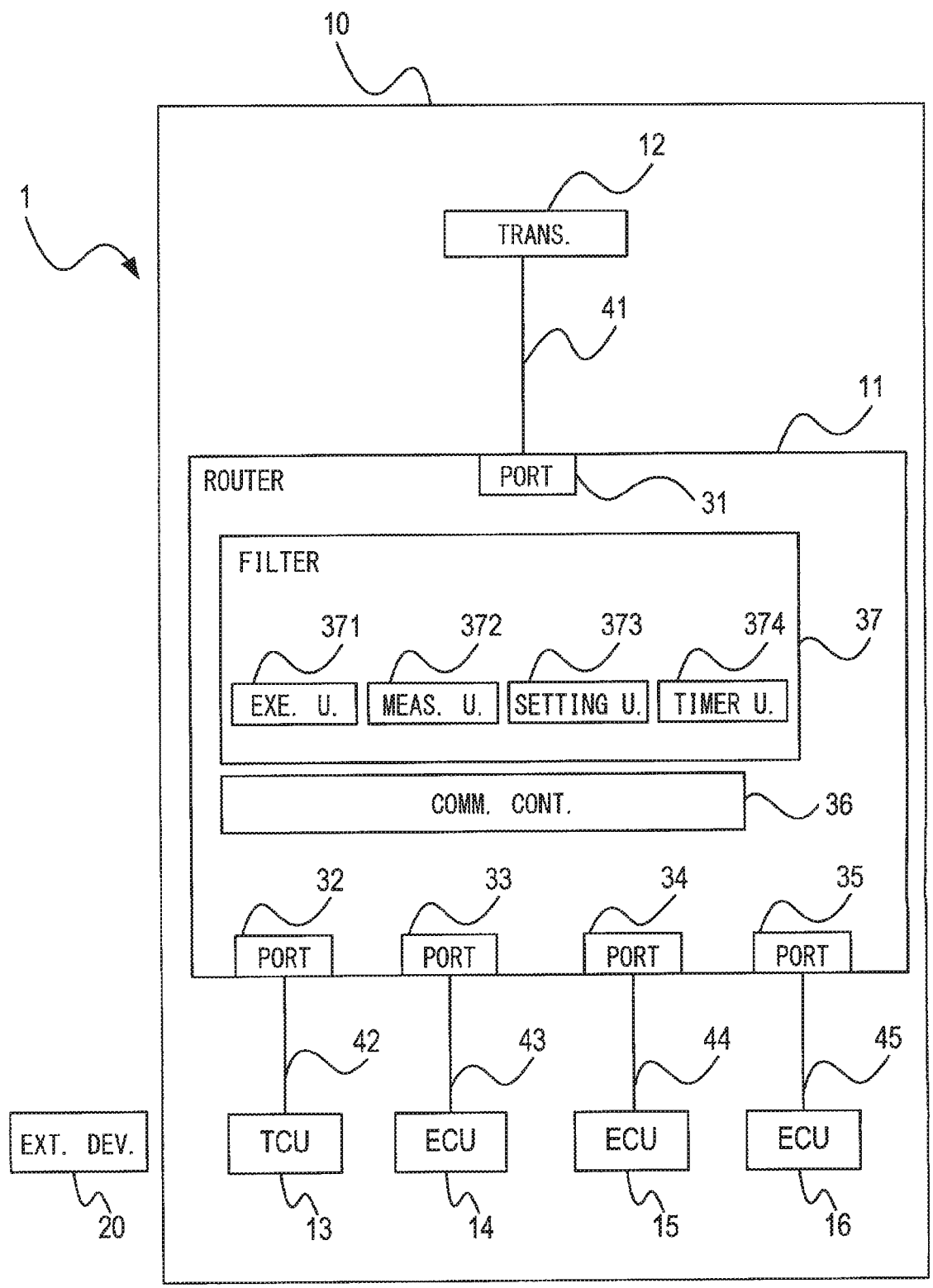
FIG. 1 illustrates a block diagram of a communication system.

With reference to FIG. 1, a communication system 1 may include an in-vehicle system 10 disposed in a vehicle (not shown) and an external device 20 disposed outside of the vehicle. The communication system 1 and its constituent elements may communicate by Ethernet and like standards, such as IEEE 802.3. "Ethernet" is a registered trademark. The communication system 1 and its constituent elements may use TCP/IP as a communication protocol. TCP is an abbreviation for Transmission Control Protocol, and IP is an abbreviation for Internet Protocol. Using such protocol, a connection between a server and a client is established by a three-way handshake. In the three-way handshake, a client requesting a connection to the server begins the procedure by transmitting a session request to the server to request a connection. Next, the server transmits a request acknowledgement to the client to acknowledge the session request. In response to the request acknowledgement from the server, the client transmits an acknowledgement to the server to establish a connection between the client and the server.

In the communication system 1, the server may be a transfer unit 12 and the client may be the external device 20 and electronic control units (ECUs) 14-16. The frame transmitted and received in the network is provided with each of the following fields, i.e., a preamble, a destination media access control (MAC) address, a sender MAC address, a virtual local area network (VLAN) tag, a type, data, and a Frame Check Sequence (FCS). The frame includes a SYN bit that indicates the frame type is a session request (i.e., when the SYN bit=1) and an ACK bit that indicates the frame type is a request acknowledgement (i.e., when the ACK bit=1).

The in-vehicle system 10 is provided with a router 11 the transfer unit 12, a Telematic Communication Unit (TCU) 13, and a plurality of ECUs 14, 15, 16. The TCU 13 is a device that communicates with the external device 20 disposed outside of the vehicle by wireless communication. That is, communication between the in-vehicle system 10 and the external device 20 is performed via the TCU 13. Each of the ECUs 14-16 is a device that controls in-vehicle devices such as an engine, a motor, and other systems and subsystems in the subject vehicle. As used herein, the vehicle having the in-vehicle system 10 may be designated as a "subject vehicle," and the router 11 and the transfer unit 12 may be collectively designated as a repeater.

The router 11 is a hardware device provided with a plurality of ports 31, 32, 33, 34, 35, a communication controller 36, and a filter 37. The communication controller 36 and the filter 37 may be disposed within the same integrated circuit (IC). That is, the communication controller 36 and the filter 37 may be integrated together in one device unit, package, IC, or Application Specific IC (ASIC).

Communication lines 41, 42, 43, 44, 45 are connected respectively to the ports 31, 32, 33, 34, 35 of the router 11. The transfer unit 12 is connected to the communication line 41 as a communication node. The external device 20 connects to the communication line 42 using the TCU 13 as a communication node. The ECUs 14, 15, 16 are respectively connected to the communication lines 43, 44, 45 as communication nodes. The TCU 13, the ECUs 14, 15, 16, and the external device 20 may all be communication nodes. Port 31 that connects the transfer unit 12 to the router 11 may be designated as a sever port. Ports 32-35 that respectively connect to TCU 13 and the ECUs 14-16 may be designated as client ports.

The router 11 relays (i.e., transmits and receives) a frame according to transfer rules that govern how frames are transferred from one port to another port.

The transfer rules include segment information and address information. The segment information is how those ports connected to the router 11 are set or rather partitioned by the communication controller 36 using a VLAN function. The address information includes addresses corresponding to each of the ports 31-35. The address information in this case may indicate an IP address and a MAC Address. The address information may be obtained from the sender address included in a frame when the frame is received.

The VLAN function is a function that divides the ports 31-35 into groups and sets up each group as a segment. A VLAN ID is assigned to a segment as a segment identifier. Segments having the same VLAN ID are considered as the same segment. The relay of frames may be enabled for the ports belonging to the same VLAN segment. For the ports not belonging to the same VLAN segment, the relay of frames is not enabled. In other words, frames cannot be relayed to ports belonging to different VLAN segments. The destination of a frame is recognized by the VLAN tag that is included in the frame. Whether the transmission destination of a frame is the same segment or a different segment is determined based on the VLAN tag.

In the present embodiment, the ports 31, 33-35 to which the transfer unit 12 and the ECUs 14-16 are respectively connected are grouped as one segment and may be designated as an internal network. The ports 31, 32 to which the transfer unit 12 and the external device 20 are respectively connected are also grouped as one segment and may be designated as an external network.

The router 11 cannot relay the frames among the ports belonging to different segments, that is, between one port belonging to the internal network and another port belonging to the external network, because of the restrictions in place from the VLAN function.

The relay of communications among ports belonging to the same segment is performed by the communication controller 36. On the other hand, the relay of communications among ports belonging to different segments is achieved by transmitting a frame from the communication controller 36 to the transfer unit 12. That is, a frame received by the transfer unit 12 is then transmitted from the transfer unit 12 to a different segment, i.e., a destination segment. In other words, the relay of communication between different VLAN segments, such as communications between the internal and external networks, is performed by the transfer unit 12. The communication controller 36 may be implemented as an integrated circuit or as a microcomputer that may be a combination of logical circuits.

The filter 37 may be used to discard a false signal (i.e., a false session request) by performing a filtering process for each of the ports 32-35 by recognizing the address information of each of the transmission signals transmitted from those ports 32-35 to the transfer unit 12.

For each port, an operating state may be set during the filtering process. The operating state may be either a normal state, a determination state, or a prohibition state.

The normal state of a port is set when the port is not receiving a session request, or set when a determination period or prohibition period has lapsed after the port receives the most recent session request.

The determination state of a port is set when the operating state of the port is in the normal state and a session request is received by such port. When the operating state of a port shifts to the determination state, the determination state continues for the determination period (i.e., preset period of time) that is set by a setting unit 373.

The prohibition state of a port is set when the operating state of the port is in the determination state and a session request is received by such port. When the operating state of a port shifts to the prohibition state, the router 11 discards frames received by the port during prohibition period (i.e., period of time) that is set by the setting unit 373.

The filter 37 has an execution unit 371, a measurement unit 372, the setting unit 373, and a timer unit 374. Units 371-374 may be realized as a combination of both hardware and software, for example, as Application Specific Integrated Circuits (ASICs). The execution unit 371 performs the filtering process.

The measurement unit 372 measures a frame reception interval for each client port, i.e., for each of the ports 32-35, and calculates a communication interval, which is an average value of the measured intervals.

The setting unit 373 sets the determination period and the prohibition period of each of the ports 32-35, i.e., client ports. The determination period is set based on a data transmission interval that is the transmission interval of the session requests from legitimate/authenticated devices. For example, the determination period may be set based on the transmission interval of the requests from the external device 20 and/or the ECUs 14-16. The determination period may be set as a period of time from a reception of a session request by the filter 37 to a reception of a request acknowledgement in response to the session request by the external device 20. After transmitting the first session request, a legitimate/authenticated external device 20 is configured not to transmit the next (i.e., second) session request until it receives a request acknowledgement in response to a first session request. The prohibition period may be set as a period of time that is substantially equal to the communication interval calculated by the measurement unit 372. As used herein, "substantially equal to" with respect to the prohibition period and the communication interval may mean that the prohibition period is proportional to the communication interval, or may mean that the prohibition period is almost equal to but shorter than the communication interval.

The timer unit 374 has a determination timer and a prohibition timer.

The determination timer is started when a port transitions to the determination state due to the filtering process. The determination timer measures how much time elapses after the start of the determination timer. When the amount of time measured by the determination timer equals the determination period set by the setting unit 373, the determination timer ends the determination state.

The prohibition timer is started when a port transitions to the prohibition state by the filtering process. The prohibition timer measures how much time elapses after the start of the prohibition timer. When the amount of time measured by the prohibition timer equals the prohibition period set by the setting unit 373, the prohibition timer ends the prohibition state.

[2. Processing]

Figure 2:
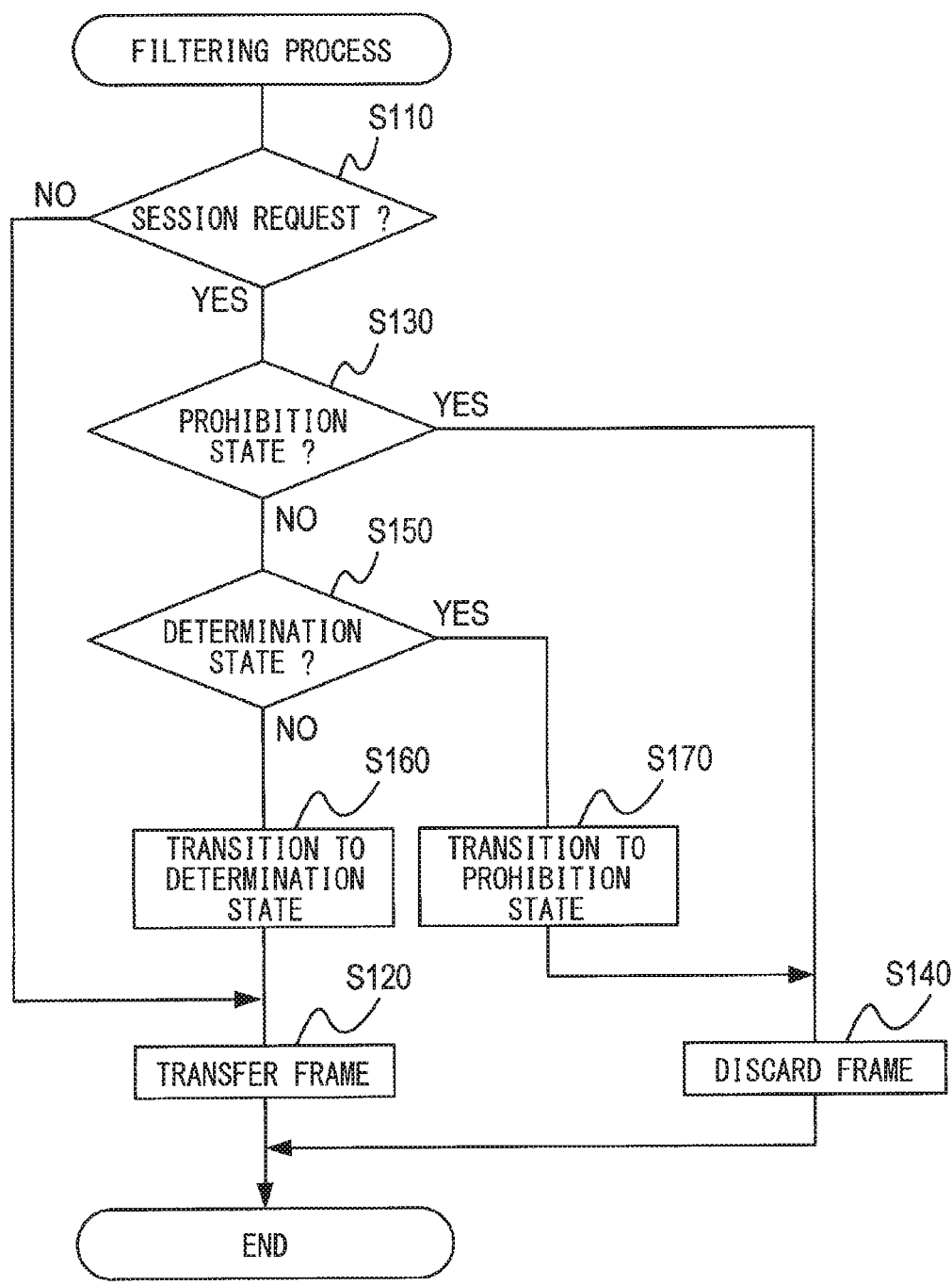
FIG. 2 is a flowchart of a filtering process performed by a filter.

With reference to FIG. 2, the filtering process performed by the execution unit 371 of the filter 37 is described. The filtering process is performed for each of the client ports 32-35 when a frame is received by each port. That is, the filtering process is performed at a client port 32-35 when a frame is received by that client port 32-35. For example, if client port 33 receives a frame, the filtering process is performed for client port 33.

At S110, the execution unit 371 determines whether the received frame is a session request.

At S110, when the execution unit 371 determines that the received frame is not a session request (i.e., NO at S110), the execution unit 371 shifts processing to S120.

At S120, the execution unit 371 transmits the received frame to the transfer unit 12 and ends the filtering process.

At S110, when the execution unit 371 determines that the received frame is a session request (i.e., YES at S110), the execution unit 371 shifts processing to S130.

At S130, the execution unit 371 determines whether the port is operating in a prohibition state.

At S130, when the execution unit 371 determines that the port is operating in the prohibition state (i.e., YES at S130), the execution unit 371 shifts processing to S140.

At S140, the execution unit 371 discards the received frame and ends the filtering process.

At S130, when the execution unit 371 determines that the port is not operating in the prohibition state (i.e., NO at S130), the execution unit 371 shifts processing to S150.

At S150, the execution unit 371 determines whether the port is operating in a determination state.

At S150, when the execution unit 371 determines that the port is not operating in a determination state (i.e., NO at S150), the execution unit 371 shifts processing to S160.

At S160, the execution unit 371 transitions the operating state of the port to the determination state and shifts processing to S120.

At S150, when the execution unit 371 determines that the port is operating in the determination state, the execution unit 371 shifts processing to S170.

At S170, the execution unit 371 transitions the operating state of the port to the prohibition state, and shifts processing to S140.

The processing performed by the execution unit 371 at S140 corresponds to the processing performed by the "discard unit" and the processing performed by the execution unit 371 at S150 corresponds to processing performed by the "determination unit." That is, depending on the type of processing performed by the execution unit 371, the execution unit 371 may be referred to as the "determination unit" or the "discard unit."

Figure 3:
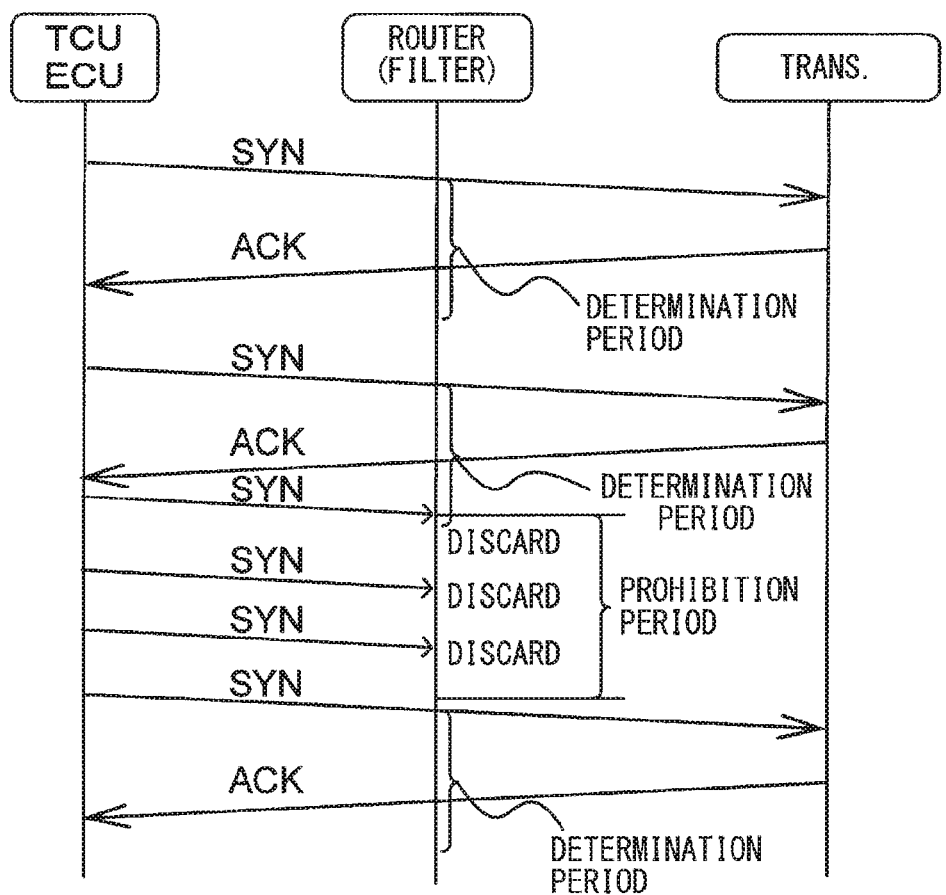
FIG. 3 illustrates a communication process performed by a router.

With reference to FIG. 3, the operation of the router 11 when the external device 20 transmits a session request to the transfer unit 12 via the TCU 13 is described. Although FIG. 3 is described using the port 32 to which the external device 20 is connected via the TCU 13 as an example, the router 11 also performs the same operation for the ports 33-35 to which the other ECUs 14-16 are connected as communication nodes.

When the port 32 is not operating in a prohibition state, that is, when the port 32 is operating in either a normal state or a determination state, the router 11 transfers a session request transmitted from the external device 20 to a port that corresponds to the address in the frame. Then, the transfer unit 12 transmits a request acknowledgement regarding the transferred session request. The router 11 transfers the response frame from the transfer unit 12 to the external device 20.

When the router 11 receives the session request from the external device 20, the determination timer is started to measure how much time has elapsed since receiving the session request. In instances where the determination timer is started and another session request is received before the elapsed time is equal to the determination period (a preset or predetermined period of time), the router 11 discards the received frame or frames, determining that the another session request is a false session request. The router 11 discards the frames regardless whether the frame is from a session request from an authenticated device or a false session request.

When the router 11 has determined that the received session request is a false session request, it starts the prohibition timer. The prohibition timer measures the amount of time that elapses after receiving a false session request until the elapsed amount of time equals the prohibition period. While the prohibition timer is measuring the elapsed time after receiving the false session request, the session request received from the external device 20 is discarded. In such instance, the determination timer is not started. After the lapse of the prohibition period, the process is reinitiated returning to S110 in FIG. 2 and the handshake process as shown at the top of FIG. 3 begins again, with the determination timer being started when a session request is received by the router 11.

[3. Effects]

The present embodiment described above may achieve the following effects.

According to the communication system 1 of the present embodiment, the router 11 determines whether a session request is false or not, and, when it is determined that an incoming request is a false session request, the router 11 discards the received frame. In such manner, the communication system 1 is protected against a DoS attack transmitting false session requests (i.e., "flooding") and limits the communication load on the transfer unit 12.

According to the communication system 1 of the present embodiment, the determination period of each of the ports 32-35, i.e., each of the client ports, is set by the setting unit 373. The determination period is set for each of the ports 32-35 based on the data transmission interval which is an interval of transmission of the session request from a legitimate/authenticated transmission device. In such manner, a false transmission device is distinguishable from the legitimate/authenticated transmission device(s) included in the communication system 1. That is, even when a false transmission device is installed, or is replaced with the legitimate transmission device, the session request from the transmission device is determined as either legitimate or false, based on the determination period set according to the communication interval of the legitimate/authenticated transmission device. Therefore, the DoS attack by the transmission of session requests from a false transmission device can be controlled/prevented. Further, when the legitimate/authenticated transmission device is replaced with a new one that has a different transmission interval, a new determination period is set by the setting unit 373 based on the transmission interval of the new (i.e., replaced) legitimate/authenticated transmission device. As such, a transmission device in the communication system 1 may be replaced without replacing the router 11.

According to the communication system 1 of the present embodiment, the determination period of each of the ports 32-35 (i.e., client ports) is set by the setting unit 373. The prohibition period is set by the setting unit 373 based on the measurement of the data communication interval between the external device 20 and the transfer unit 12 of the router 11. Therefore, when the data communication interval between the external device 20 and the transfer unit 12 is short, by making the prohibition period set by the setting unit 373 shorter, impediments to the exchange of data by the prohibition timer may be prevented. Alternatively, setting a long prohibition period prevents the reception of session request for an increased amount of time.

According to the communication system 1 of the present embodiment, because data sifting/filtering is performable at each of the ports to which the external device 20 is connected via the TCU 13 and the ECUs 14-16 are respectively connected, not only can a false (i.e., non-authenticated or malicious) external device be determined, but the communication system 1 can also determine if any of the ECUs are a false ECU.

[4. Other Embodiments]

Although the embodiment of the present disclosure is described in to various aspects, the present disclosure is not limited to the above-mentioned embodiment. That is, the following are further considered as belonging to the present disclosure.

According to the above-mentioned embodiment, communication is performed by the standard TCP/IP protocol. However, the present disclosure is applicable to communication by other communication protocols other than the above. That is, the present disclosure is applicable to any communication as long as the connection between the server and the client is established by the three-way handshake, i.e., the communication protocol may be, for example, SCTP or the like. SCTP is an abbreviation for Stream Control Transmission Protocol.

According to the above-mentioned embodiment, the communication controller 36 and the filter 37 in the router 11 are implemented by a process within the same integrated circuit. However, the communication controller 36 and the filter 37 may be implemented, for example, by two different processes respectively within two different integrated circuits.

According to the above-mentioned embodiment, the external device is connected to the in-vehicle system via the TCU. However, the external device may be directly connected to the in-vehicle system via a connector, i.e., may be mechanically connected to the in-vehicle system without using the TCU.

Two or more functions in one component in the above embodiment may be born and realized by two or more components in different embodiments. One function in one component in the above embodiment may be born and realized by two or more components in different embodiments.

Further, two or more functions in two or more components in the above embodiment may be born and realized by one component in different embodiments. One function in two or more components in the above embodiment may be born and realized by one component in different embodiments.

Further, a part of the configuration in the above embodiment may be omitted, and a part of the configuration in the above embodiment may be replaced with the configuration of the other embodiments, or may be added to the configuration of the other embodiments. The technical thought of the present disclosure covers various aspects of the art derivable and conceivable from the wording in the claims.

The present disclosure may also be realizable in various forms, such as a system having the repeater described above, a program for controlling a computer to serve as the above repeater, a non-transitive, substantive recording medium, a method of repeating a frame, and the like.

Such changes, modifications, and summarized schemes are to be understood as within the scope of the present disclosure as defined by appended claims.

What is claimed is:

1. A repeater disposed within a vehicle comprising:
    a communication controller configured to relay data within an external network including an external device, the external device transmitting data from outside of the vehicle to at least one in-vehicle device and to relay data within an internal network including the in-vehicle device;
    a transfer unit configured to transfer data from a first network to a second network, the first network having the at least one in-vehicle device and the external device, each of the at least one in-vehicle device and the external device being a transmission device that transmits data to the transfer unit; and
    a filter configured to sift data transmitted from the second transmission device and transferred by the transfer unit,
    wherein
    the filter includes:
        a setting unit configured to set a determination period and a prohibition period, the determination period set based on specificity of the transmission device and the prohibition period having a preset duration;
        a determination unit configured to determine whether data of a preset type is received from the second transmission device at an interval equal to or shorter than the determination period set by the setting unit; and
        a discard unit configured to discard the received data from the second transmission device during the prohibition period of the preset duration by the setting unit when it is determined by the determination unit that the data from the transmission device is received at the interval equal to or shorter than the determination period,
    the second network is different than the first network,
    the determination unit determines whether any of plural ports has received data of the preset type from the transmission device at the interval equal to or shorter than the determination period set to the plural ports, and
    when it is determined by the determination unit that any of the plural ports has received data of the preset type from the transmission device at the interval equal or shorter than the determination period, the discard unit discards the data of the preset type from the transmission device at the relevant port during the prohibition period set by the setting unit.

2. The repeater of claim 1, wherein
    the preset type of data is a session request.

3. The repeater of claim 1, wherein
the communication controller and the filter are integrated in one device unit.

4. The repeater of claim 1, wherein
the communication controller and the filter are realized as one integrated circuit.

5. The repeater of claim 1, wherein
both of the communication controller and the filter are hardware components of a router, and wherein
the router has a plurality of ports for a connection to each of the transmission devices.

6. The repeater of claim 5, wherein
the communication controller logically sets the internal network and the external network.

7. The repeater of claim 1, wherein
the repeater is provided with the plural ports for connection to the in-vehicle device and to the external device,
the setting unit sets, to each of the plural ports, the determination period and the prohibition period.

8. The repeater of claim 1, wherein
the filter is provided with:
a measurement unit that measures interval of data reception for each of the ports and calculates a communication interval, and
the prohibition period is set to be a period of time that is substantially equal to the communication interval calculated by the measurement unit.

9. A communication system comprising:
an external device configured to transmit data from outside of a vehicle at a preset data transmission interval to at least one in-vehicle device disposed within the vehicle; and
a repeater disposed within the vehicle, wherein the repeater includes:
a communication controller configured to relay data to exchange data between an external network including the external device and an internal network including the in-vehicle device;
a transfer unit configured to transfer data from a first network to a second network, the first network including the at least one in-vehicle device and the external device, each of the at least one in-vehicle device and the external device being a transmission device that transmits data to the transfer unit; and
a filter configured to sift data transmitted from the second transmission device and transferred by the transfer unit, the filter including:
a setting unit configured to set a determination period and a prohibition period, the determination period set based on specificity of the transmission device and the prohibition period having a preset duration;
a determination unit configured to determine whether data of a preset type is received from the second transmission device at an interval equal to or shorter than the determination period set by the setting unit; and
a discard unit configured to discard the received data from the second transmission device during the prohibition period of the preset duration set by the setting unit when it is determined by the determination unit that the data from the transmission device is received at the interval equal to or shorter than the determination period, and
wherein
the second network is different than the first network,
the determination unit determines whether any of plural ports has received data of the preset type from the transmission device at the interval equal to or shorter than the determination period set to the plural ports, and
when it is determined by the determination unit that any of the plural ports has received data of the preset type from the transmission device at the interval equal or shorter than the determination period, the discard unit discards the data of the preset type from the transmission device at the relevant port during the prohibition period set by the setting unit.

10. The communication system of claim 9, wherein
the data transmission interval is a period of time between a data transmission by the transmission device and a data reception by the transmission device, wherein the data reception is a response from the transfer unit acknowledging the data transmitted by the transmission device.

11. The communication system of claim 9, wherein
when the transmission device transmits data, the transmission device waits to receive a response from the transfer unit acknowledging the transmitted data before transmitting subsequent data.

12. The communication system of claim 9, wherein
the repeater includes:
a plurality of ports;
a measurement unit configured to measure a communication interval for each of the plurality of ports; and
a setting unit configured to set the prohibition period for each of the plurality of ports, the prohibition period proportional to and shorter than the communication interval.

13. The communication system of claim 9, wherein
the communication system communicates according to an Ethernet standard.

14. The communication system of claim 9, wherein
the communication system establishes a connection between the transmission device and the transfer unit by performing a three-way handshake.

15. The communication system of claim 14, wherein
the communication system communicates according to a TCP/IP protocol standard.

16. The communication system of claim 14, wherein
the communication system communicates according to an SCTP standard.

17. The communication system of claim 9, wherein
the repeater is provided with the plural ports for connection to the in-vehicle device and to the external device,
the setting unit sets, to each of the plural ports, the determination period and the prohibition period.

18. The communication system of claim 17, wherein
the filter is provided with:
a measurement unit that measures interval of data reception for each of the ports and calculates a communication interval, and
the prohibition period is set to be a period of time that is substantially equal to the communication interval calculated by the measurement unit.

* * * * *